United States Patent
Hind et al.

(10) Patent No.: US 6,918,039 B1
(45) Date of Patent: Jul. 12, 2005

(54) METHOD AND AN APPARATUS FOR DETECTING A NEED FOR SECURITY AND INVOKING A SECURED PRESENTATION OF DATA

(75) Inventors: John R. Hind, Raleigh, NC (US); Marcia L. Peters, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/573,859

(22) Filed: May 18, 2000

(51) Int. Cl.[7] .......................... G06F 11/30; G06F 12/14; H04L 9/00; H04L 9/32
(52) U.S. Cl. ...................... 713/200; 713/201; 713/202; 713/176
(58) Field of Search ............................... 713/200, 201, 713/202, 166–168, 176; 380/258, 241

(56) References Cited

U.S. PATENT DOCUMENTS

| | | | |
|---|---|---|---|
| 4,271,482 A | | 6/1981 | Giraud ........................ 364/900 |
| 5,048,085 A | | 9/1991 | Abraham et al. ............. 380/23 |
| 5,471,616 A | * | 11/1995 | Johnson et al. ............. 713/200 |
| 5,493,613 A | | 2/1996 | Denno et al. ................. 380/24 |
| 5,555,376 A | * | 9/1996 | Theimer et al. ............. 709/229 |
| 5,647,010 A | | 7/1997 | Okubo et al. ............... 382/100 |
| 5,719,561 A | * | 2/1998 | Gonzales ................... 340/7.51 |
| 5,757,916 A | * | 5/1998 | MacDoran et al. ......... 380/258 |
| 5,780,825 A | * | 7/1998 | Sato et al. .................. 235/379 |
| 5,880,447 A | | 3/1999 | Okada et al. ................ 235/380 |
| 5,933,498 A | * | 8/1999 | Schneck et al. .............. 705/54 |
| 5,937,064 A | | 8/1999 | Eick et al. ...................... 380/9 |
| 5,937,069 A | | 8/1999 | Nagai et al. .................. 380/49 |
| 6,011,905 A | | 1/2000 | Huttenlocher et al. ....... 395/102 |

* cited by examiner

Primary Examiner—Gilberto Barrón, Jr.
Assistant Examiner—G. Gurshman
(74) Attorney, Agent, or Firm—Duke W. Yee; Jerry W. Herndon; Stephen J. Walder, Jr.

(57) ABSTRACT

A method and an apparatus in a data processing system detects the presence of sensitive data and renders this data in a secured manner. The data processing system may be any device with information presentation capability which can receive data from a network. Detecting a need for secured rendering may include recognition that the data was encrypted, tags in the data indicating a level of secured rendering, or various forms of pre-arrangement between the sender and the recipient. Ways to determine if the recipient is in a secured environment include detection of conversations in the environment, video images showing people in the environment, analysis of infrared signals, determining the location of the data processing system using GPS or similar means, or interaction with an authenticated user. The means for rendering may be specified in the data, may be determined by the recipient, may be determined by pre-agreement between the sender and recipient, or may be based on the capability of the data processing system. Secured rendering means include, but are not limited to, display of data in a visual format that requires a special lens for detection, speaking the data into a speaker device in an ear canal of the recipient, or use of a special coded format known only to the recipient.

38 Claims, 6 Drawing Sheets

100
Network

```
<renderUnclassified>
This message may be viewed in public
</renderUnclassified>
<renderSecurely>
Present this message with secure rendering
</renderSecurely>
```

Figure 5A

```
<renderUnclassified>
The contract price is $1000.
<renderInternalUseOnly>
Our real cost is $500.
</renderInternalUseOnly>
This offer is valid until 5/5/2000.
</renderUnclassified>
```

Figure 5B

```
<quote $render="normal">
    <listprice color="green"> 49.99 </listprice>
    <price $render="securely"> 35.40 </price>
    <cost $render="secure environment only"> 25.00 </cost>
</quote>
```

Figure 6

METHOD AND AN APPARATUS FOR DETECTING A NEED FOR SECURITY AND INVOKING A SECURED PRESENTATION OF DATA

CROSS-REFERENCE TO RELATED APPLICATIONS

The present invention is related to the following applications entitled "METHOD, SYSTEM AND APPARATUS FOR SELECTING ENCRYPTION LEVELS BASED ON POLICY PROFILING"; U.S. application Ser. No. 09/240,387; which is and incorporated herein by reference in its entirety.

BACKGROUND OF THE INVENTION

1. Technical Field

The present invention relates generally to improved data security and in particular to a method and an apparatus for invoking a secured method for rendering data. Still more particularly, the present invention provides a method and an apparatus for detecting the need for data security and selecting an appropriate means for presenting the data in a secured manner.

2. Description of the Related Art

Digital communications occurs in a wide variety of environments and with many different types of devices. Some devices, such as a cellular telephone or a wireless personal digital assistant (PDA), are used in different ambient environments, many of which might be unsecured for accessing sensitive data. Other devices, such as desktop computers, are typically in a fixed location where the environment is relatively stable. However, even in this situation, the environment may be changing due to different people being able to view a computer screen or being able to hear voice communications.

Data encryption is commonly used to provide data security when the data is being transferred over a network. There are a variety of encryption techniques. Data Encryption Standard (DES) is based on use of a symmetric private key with the level of security varying according to key length, typical lengths ranging from 56-bit DES to 256-bit DES. Public key cryptography, also called the RSA method, named after the inventors Rivest, Shamir, and Adleman, uses an asymmetrical key pair in which one key is public and the other key is private. Data is typically encrypted by using the recipient's public key, and can only be decrypted by using the recipient's private key. The roles of the two keys can also be reversed, such as digitally signing a document using the sender's private key, and validating the signature using the sender's public key. RSA is very computation intensive, thus it is often used to create a digital envelope, which holds an RSA-encrypted DES key and DES-encrypted data. This method encrypts the secret DES key so that it can be transmitted over the network, but encrypts and decrypts the actual message using the much faster DES algorithm. A related invention, U.S. patent application Ser. No. 09/240,387, describes a method and apparatus for selecting encryption levels based on policy profiling.

After data is received at the destination, it is decrypted and presented to the user. This presentation is typically visual, audio, or a combination of rendering methods. The data is no longer secured at the time of rendering and, if the ambient environment in unsecured, others may gain access to the data. For example, others may hear a voice mail played back in a public environment. Therefore, it would be advantageous to use a secured means of rendering so that only the intended recipient can receive sensitive information even if the information is presented in an unsecured environment.

SUMMARY OF THE INVENTION

A method and an apparatus in a data processing system detects the presence of sensitive data and renders this data in a secured manner. The data processing system may be any device with information presentation capability which can receive data from a network. Detecting a need for secured rendering may include recognition that the data was encrypted, tags in the data indicating a level of secured rendering, or various forms of pre-arrangement between the sender and the recipient. Ways to determine if the recipient is in a secured environment include detection of conversations in the environment, video images showing people in the environment, analysis of infrared signals, determining the location of the data processing system using GPS or similar means, or interaction with an authenticated user. The means for rendering may be specified in the data, may be determined by the recipient, may be determined by pre-agreement between the sender and recipient, or may be based on the capability of the data processing system. Secured rendering means include, but are not limited to, display of data in a visual format that requires a special lens for detection, speaking the data into a speaker device in an ear canal of the recipient, or use of a special coded format known only to the recipient.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5A shows how XML tags can be used to mark certain areas of a message for secured rendering in accordance with a preferred embodiment of the present invention;

FIG. 5B shows how XML tags can be nested in the same message in accordance with a preferred embodiment of the present invention; and FIG. 6 shows an alternative embodiment where attributes of XML tags are used to indicate the mode of rendering.

DETAILED DESCRIPTION OF THE PREFERRED EMBODIMENT

Figure 1:
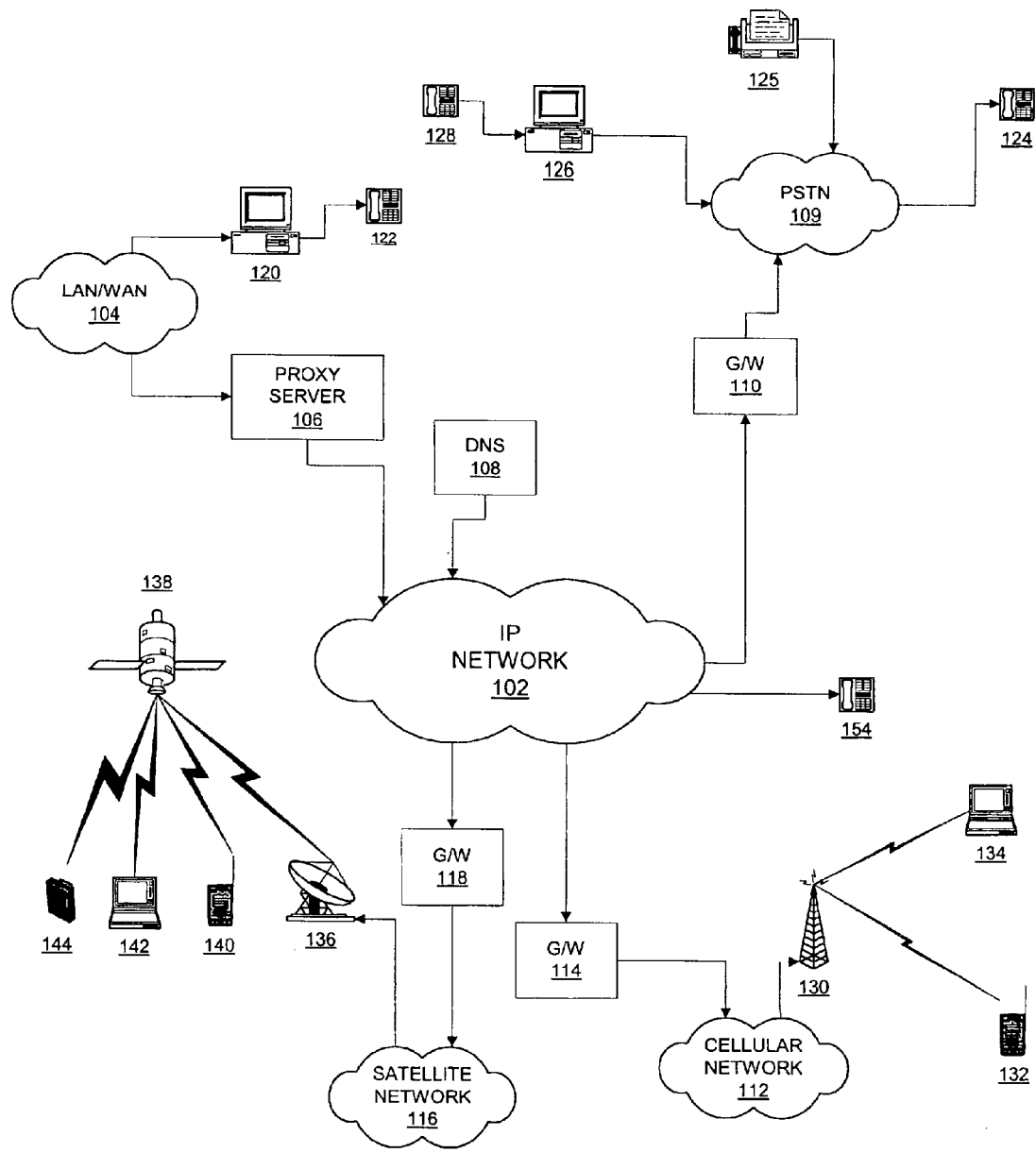
FIG. 1 is a system diagram illustrating a distributed data processing and telephony system in which the present invention may be implemented.

With reference now to the figures, and in particular with reference to FIG. 1, a system diagram illustrating a distributed data processing and telephony system in which the present invention may be implemented is depicted.

Distributed data processing system 100 is a plurality of interconnected heterogeneous networks in which the present invention may be implemented. As illustrated, distributed data processing system 100 contains an Internet Protocol (IP) network 102, a Local Area Network (LAN)/Wide Area Network (WAN) 104, the Public Switched Telephone Network (PSTN) 109, a cellular wireless network 112, and a satellite communication network 116. Networks 102, 104, 109, 112, and 116 may include permanent connections, such as wire or fiber optic cables, or temporary connections made through telephone connections.

IP network 102 may be the publicly available IP network (the Internet), a private IP network, or a combination of public and private IP networks. In any case, IP network 102 operates according to the Internet Protocol and routes packets among its many switches and through its many transmission paths. IP networks are generally known in the art to be expandable, fairly easy to use and heavily supported. Coupled to IP network 102 is a Domain Name Server (DNS) 108 to which queries may be sent, such queries each requesting an IP address based upon a Uniform Resource Locator (URL). IP network 102 supports 32-bit IP addresses as well as 128-bit IP addresses, which are currently in the planning stage.

LAN/WAN 104 couples to IP network 102 via a proxy server 106 (or another connection). LAN/WAN 104 may operate according to various communication protocols, such as the Internet Protocol, the Asynchronous Transfer Mode (ATM) protocol, or other known packet switched protocols. Proxy server 106 serves to route data between IP network 102 and LAN/WAN 104. A firewall that precludes unwanted communications from entering LAN/WAN 104 may also be located at the location of proxy server 106.

Computer 120 couples to LAN/WAN 104 and supports communications with LAN/WAN 104. Computer 120 may employ the LAN/WAN and proxy server 106 to communicate with other devices across IP network 102. Such communications are generally known in the art and will not be further described herein except to expand upon the teachings of the present invention. As is also shown, phone 122 couples to computer 120 and may be employed to initiate IP Telephony communications with another phone or voice terminal using IP Telephony. An IP phone 154 connected to IP network 102 (or other phone, e.g., phone 124) may communicate with phone 122 using IP telephony.

PSTN (Public Switched Telephone Network) 109 is a circuit switched network that is primarily employed for voice communications, such as those enabled by a standard phone 124. However, PSTN 109 also supports the transmission of data. Data transmissions may be supported to a tone-based terminal, such as a FAX machine 125, to a tone-based modem contained in computer 126, or to another device that couples to PSTN 109 via a digital connection, such as an Integrated Services Digital Network (ISDN) line, an Asynchronous Digital Subscriber Line (ADSL), or another digital connection to a terminal that supports such a connection. As illustrated, a voice terminal, such as phone 128, may couple to PSTN 109 via computer 126 rather than being supported directly by PSTN 109, as is the case with phone 124. Thus, computer 126 may support IP telephony with voice terminal 128, for example. PSTN 109 accesses IP Network 102 via Gateway 110.

Cellular network 112 supports wireless communications with terminals operating in its service area (which may cover a geographic S region such as a city, county, state, country, etc.). As is known, cellular network 112 includes a plurality of towers, e.g., 130, that each service communications within a respective cell. Wireless terminals that may operate in conjunction with cellular network 112 include wireless handsets 132 and wirelessly enabled laptop computers 134, for example. Wireless handsets 132 could be, for example, personal digital assistants, wireless or cellular telephones, or two-way pagers. Cellular network 112 couples to IP network 102 via gateway 114.

Wireless handsets 132 and wirelessly enabled laptop computers 134 may communicate with cellular network 112 using the Wireless Application Protocol (WAP) suite. WAP is an open, global specification that allows mobile users with wireless devices, such as, for example, mobile phones, pagers, two-way radios, smartphones, communicators, personal digital assistants, and portable laptop computers, to easily access and interact with information and services almost instantly. WAP is a communications protocol and application environment and can be built on any operating system including, for example, Palm OS, EPOC, Windows CE, FLEXOS, OS/9, and JavaOS. WAP provides interoperability even between different device families.

The WAP suite provides the wireless equivalent of Hypertext Transfer Protocol (HTTP) and Hypertext Markup Language (HTML). The HTTP-like component defines the communication protocol between the handheld device and a server or gateway. This component addresses characteristics that are unique to wireless devices, such as data rate and round-trip response time. The HTML-like component, Wireless Markup Language (WML), defines new markup and scripting languages for displaying information to and interacting with the user. This component is highly focused on the limited display size and limited input devices available on small, handheld devices. For example, a typical cell phone may have only a 4×10-character display with 16-gray levels and only a numeric keypad plus up/down volume keys.

Cellular network 112 operates according to an operating standard, which may be the Advanced Mobile Phone System (AMPS) standard, the Code Division Multiple Access (CMA) standard, the Time Division Multiple Access (DMA) standard, or the Global System for Mobile Communications or Groupie Special Mobile (GSM), for example. Independent of the standard(s) supported by cellular network 112, cellular network 112 supports voice and data communications with terminal units, e.g., 132 and 134.

Satellite network 116 includes at least one satellite dish 136 that operates in conjunction with a satellite 138 to provide satellite communications with a plurality of terminals, e.g., laptop computer 142, satellite handset 140, and pager 144. Satellite network 116 may be serviced by one or more geosynchronous orbiting satellites, a plurality of medium earth orbit satellites, or a plurality of low earth orbit satellites. In any case, satellite network 116 services voice and data communications and couples to IP network 102 via gateway 118.

FIG. 1 is intended as an example and not as an architectural limitation for the processes of the present invention. For example, distributed data processing system 100 may include additional servers, clients, and other devices not shown. The present invention would be most commonly used with devices such as computers 120 and 126, laptops 134 and 142, handsets 132 and 140, and pager 144. Sensitive data would be encrypted while transferred on IP network 102, would be decrypted at the recipient device, such as handset 132, then presented to the recipient using a secured form of rendering.

Figure 2:
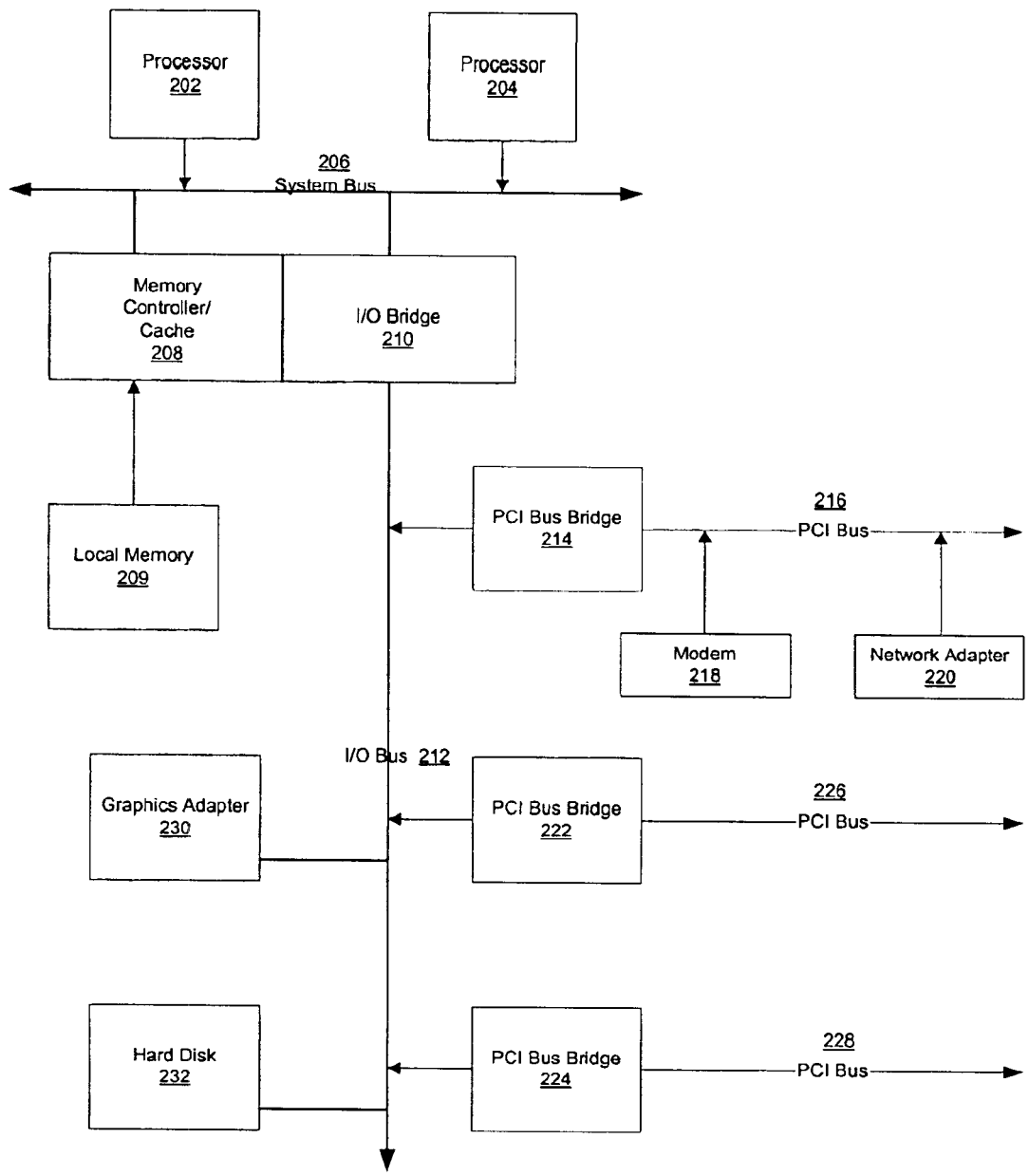
FIG. 2 is a block diagram of a data processing system which is representative of a server in which the present invention may be implemented.

Referring to FIG. 2, a block diagram of a data processing system which may be implemented as a server, such as proxy server 106 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of communications adapters 218–220 may be connected to PCI bus 216. Typical PCI bus implementations will support four PCI expansion slots or add-in connectors. Communications links to network computers 152 and 156 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly. Those of ordinary skill in the art will appreciate that the hardware depicted in FIG. 2 may vary. The depicted example is not meant to imply architectural limitations with respect to the present invention.

Server machines are often the source of sensitive data, such as data regarding a purchase, or the recipient of sensitive data, such as a credit card number submitted by a client to make a purchase. Servers communicate the information that has been designated for secured rendering on the client machine, which is described next in FIG. 3.

Figure 3:
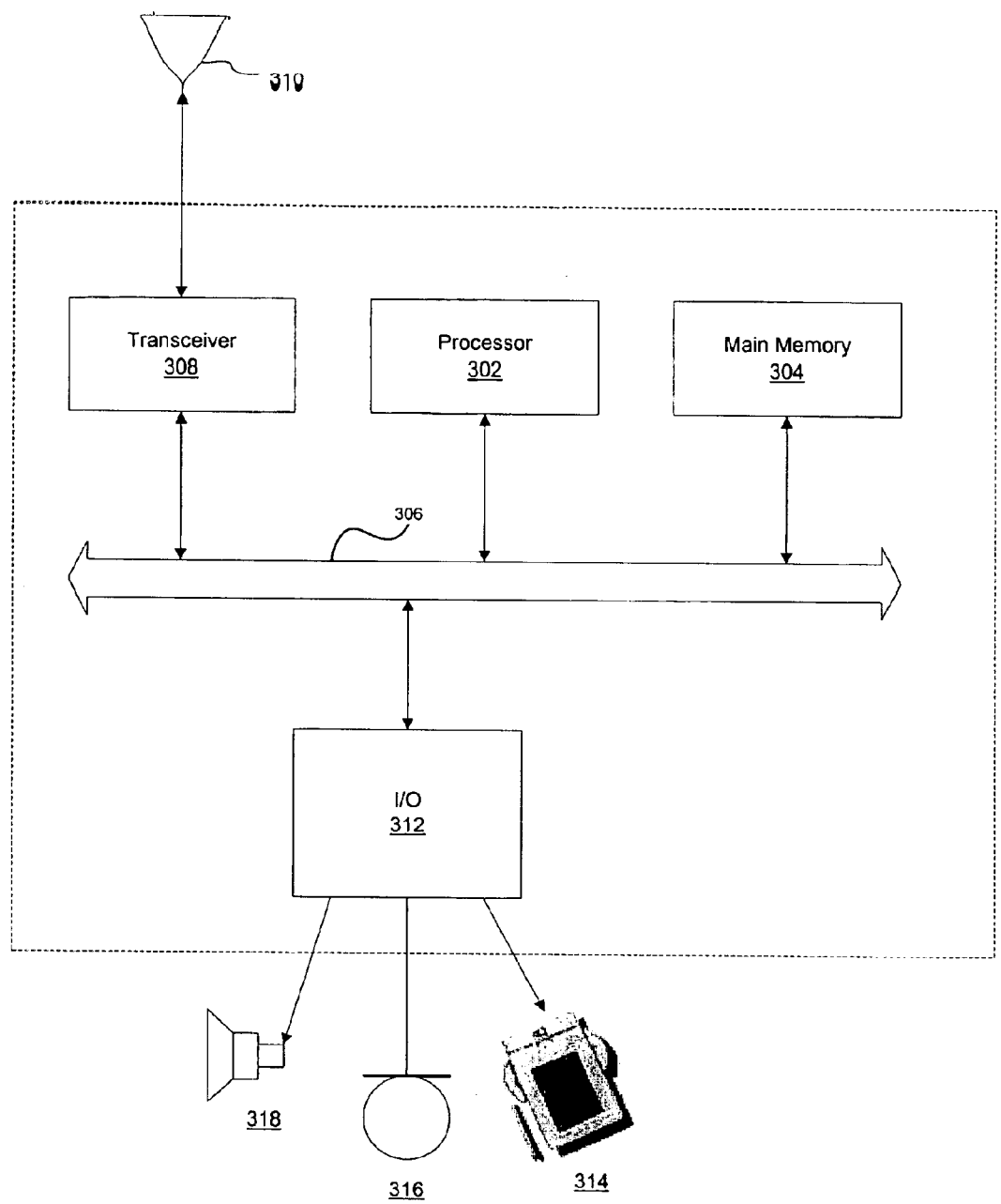
FIG. 3 is a block diagram of a data processing system which is representative of a client in which the present invention may be implemented.

With reference now to FIG. 3, a block diagram of a mobile data processing system in which the present invention may be implemented is illustrated. Data processing system 300 is an example of a mobile client. Processor 302 and main memory 304 are connected to local bus 306. Transceiver 308 is also connected to the bus. Using antenna 310 the transceiver provides wireless input and output to other components on network 100 in FIG. 1; this includes communications with server 200 in FIG. 2.

Mobile client 300 also provides local input and output facilities for the user via I/O bridge 312. Display and touch screen 314 is a common way to display output on an LCD screen and to perform input by touching the screen with a finger or stylus. Additional input/output devices shown are microphone 316 and speaker 318. As one of ordinary skill in the art will appreciate, there are a wide variety of mobile computing devices, including notebook computers, palm computers, personal digital assistants, pagers, cellular telephones, etc. Some devices include keyboards while others use virtual keyboards, handwriting recognition, voice recognition or key pads. Although the device illustrated in FIG. 3 is a rather simple mobile device, such as a personal digital assistant, more complex devices, such as a sophisticated laptop computer equipped for wireless communications, are certainly possible. The architecture of these more complex devices would be similar to the architecture of a server computer, as shown in FIG. 2. Yet other devices are possible, such as a digital watch, a television, a cable interface box, or a game controller.

Figure 4:
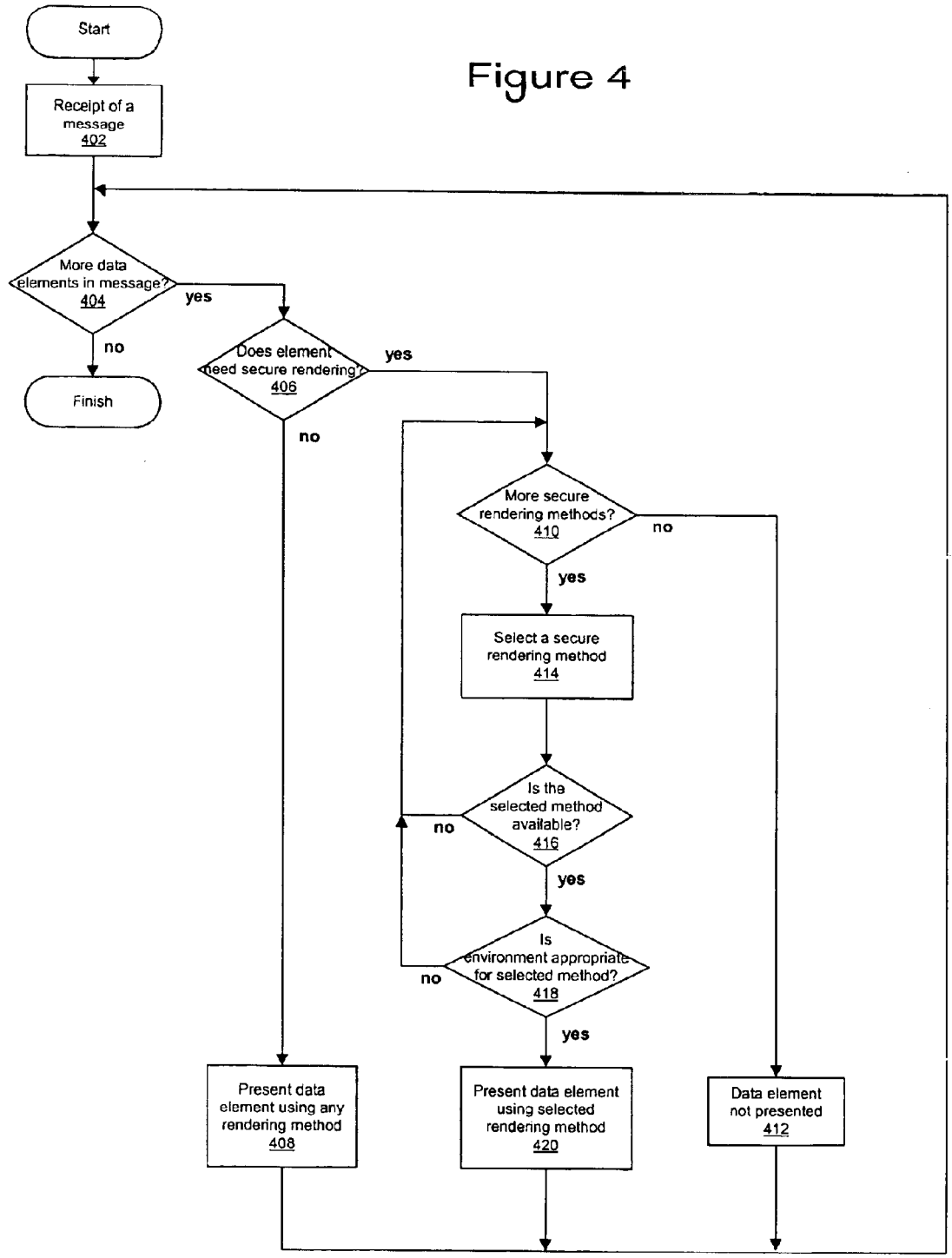
FIG. 4 is a flowchart that shows the decision process for rendering a message or portion of a message in either secured and unsecured mode in accordance with a preferred embodiment of the present invention.

With reference now to FIG. 4, a flowchart is given that shows the decision process for rendering the data elements of a message. There may be multiple security policies. For example, assume there are three policies: "unclassified", "confidential", and "internal use only." Each of these policies will have a list of allowable secure rendering methods associated with it. To illustrate this point, assume that the "confidential" policy has the following allowed rendering methods: "in a secure area display text", "in an unsecure area display ear icon and speak text to earphone when icon clicked", and "in an unsecure area display lock icon and shake device." The "internal use only", policy might allow the following rendering methods: "in an unsecure area display obfuscated text", "in an unsecure area translate text to user selected icons for display", and "in a secure area display text." Each data element in a message is associated with a policy ("unclassified", "confidential", and "internal use only", in this example) using XML tags or some equivalent mechanism. For a given data element in a message, the selection of a rendering method from the methods allowed by the policy depends on the methods supported by the device and user preferences.

The operating environment of the device may be a user selected value or may be automatically derived by the device itself. An example of a user selected environment would be a control, such as a radio button displayed on the user interface screen or a switch which the user must set to a value. An example of a device derived environment would be a table lookup of a GPS device position yielding, for example, "the environment is secure if the device is in the owner's home or office." While this example only illustrated two states for the environment, namely "secure" and "unsecure", many states are possible and applicable to the techniques presented in this invention.

After the receipt of the message (step 402 in FIG. 4), each data element is processed in turn. If there are no more data elements (step 404: No), then the operation is finished. If there are more data elements (step 404: Yes), then the next element is examined. The need for the secure presentation of a data items may be indicated by a tag name, an attribute value coded in a tag, a default attribute value inferred from a document definition, and a pre-arrangement between the sender and receiver. The pre-arrangement may be based on one of a network registry, a network directory, or a security profile.

Determination of the need for secured rendering might be based on whether the message received over the network was encrypted or not. If the data element does not require secure rendering (step 406: No), then the data element is presented using "normal" rendering (step 408) and processing continues with the next data element (step 404). Normal rendering means any technique either selected by the user or selected automatically.

If the element contains sensitive information that requires secure rendering (step 406: Yes), then a list of allowed rendering techniques associated with the specified security policy is presented. These methods are ordered according to the device capability and the preferences of the user. If the ordered list is empty because no method is appropriate (step 410: No), then the data element is not presented (step 412) and processing continues with the next data element (step 404).

If there are more rendering methods to be considered (step 410: Yes), then one of the remaining methods is selected (step 414). If the selected method is not available (step 416: No), then the operation proceeds to process any remaining rendering methods (step 410). An example of a method supported by the device which might not be available at the time of rendering is speaking the data element into an earphone if an earphone is not plugged in. If the selected method is available (step 416: yes), then it is determined if the environment is appropriate for the selected method. If the environment is not appropriate (step 418: No), then other rendering methods are considered (step 410).

Determination of appropriateness of the environment can be based on interaction with the recipient, detection of conversations, reception of video images showing people other than the recipient in the environment, analysis of infrared signals, analysis of signals from a motion detector, and determining a location of the data processing system.

If the rendering method is appropriate for the current environment (step 418: Yes), then the sensitive data element is presented using the selected rendering method (step 420). Some of the possible rendering means are a personal display in a pair of eyeglasses, a speaker device in an ear canal of the recipient, a vibrating device, a Braille touch printer and a special coded format known only to the recipient. This process continues with the next data element in the message (step 404).

FIG. 4 is intended as an example of the decision process and not as a limitation on alternative decision processes. Fewer or more security policies and environments are possible and numerous rendering methods may be defined for a given policy and/or environment. As one of ordinary skill in the art will appreciate, the setting of policy, which is done in a preferred embodiment with XML tags, and the choice of rendering and/or obfuscation methods, either by user selection or automatically, can be expanded to a wide variety of techniques and environments.

With reference now to FIGS. 5A and 5B, XML tags are shown that could be used to mark certain areas of a message for secured rendering. The use of tags in a markup language is a common practice, as evidenced by the emergence of HTML (hypertext markup language) and its derivatives, such as XML (extensible markup language). The tags shown in these figures, renderUnclassified, renderSecurely, and renderInternalUseOnly, have names suggestive of their function. As one of ordinary skill in the art will appreciate, other names or other mechanisms different than XML could be used to indicate which sections of a message can be rendered in a normal mode and which sections require secured rendering. Although text messages are shown, messages in other formats, such as audio or video, could also be marked for secured rendering. In the case of devices capable of multiple secured rendering modes, it is possible to include addition information regarding a preferred secured rendering mode.

FIG. 5A contains two distinct message areas. The first message, the text "This message may be viewed in public", is tagged for normal presentation by the renderUnclassified tags. The second message, the text "Present this message with secured rendering", is tagged for secured presentation by the renderSecurely tags.

FIG. 5B shows that it is possible to nest tags. Although the entire message is tagged renderUnclassified, inside the message one section is tagged renderInternalUseOnly. In general, the most local set of rendering tags will determine the mode of presentation. In this case, the text, "Our real cost is $500", will be rendered securely and in an appropriate environment. The remainder of the message will be rendered in normal mode.

With reference now to FIG. 6, an alternative strategy for using a markup languages such as XML is presented. It is possible to attach attributes to elements which can be used to convey the need for secure rendering. In this example, the list price of 49.99 is rendered normally, corresponding to step 406 in FIG. 4. The "price" of 35.40 is rendered securely. The cost of 25.00 is only rendered if the environment is secure.

Attributes for a given element may have element specific default values and or global document default values defined with by the definition of the document in the given markup language, for example the Document Type Definition (DTD) for an XML document. It is therefore possible that the actual content of the document might not have any visible representation of rendering needs yet convey, by its content definition and use of element attribute default values, rendering requirements per element.

This same logical principle holds true for non-markup-language data streams. In such systems, both communicating applications may agree in advance or by predefinition on how to render specific subfields of the data stream.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method in a data processing system for presenting data to a recipient rendered in a secured manner, the method comprising the steps of:

receiving data having a plurality of portions, wherein at least one portion of the data requires secured rendering;

selecting, for each of the plurality of portions, a means for rendering, wherein a selected means for rendering for the at least one portion of the data is a means for secured rendering;

determining whether the selected means for secured rendering is appropriate for an ambient environment of the recipient; and presenting the plurality of portions of the data to the recipient using the various selected means for rendering.

2. The method of claim 1, wherein the data processing system is one of a personal computer, a workstation, a laptop computer, an information appliance, a personal digital assistant, a handheld organizer, a pager, a cellular telephone, a digital watch, a television, a cable interface box, a game console and an information presentation device.

3. The method of claim 1, wherein receiving the at least one portion of the data includes recognition that the at least one portion of the data was encrypted when transmitted on a network.

4. The method of claim 1, wherein receiving the at least one portion of the data includes identifying one of a tag name, an attribute value coded in a tag, and a default attribute value inferred from a document definition, specifying the one or more portions of data being secured.

5. The method of claim 1, wherein the selecting means for rendering includes a pre-arrangement between a sender and the recipient based on one of a network registry, a network directory, and a security profile.

6. The method of claim 1, wherein the selecting mans for rendering includes identifying a means for rendering based on a tag name and an attribute value in the data.

7. The method of claim 1, wherein the selecting means for rendering includes receiving a selection of a means from the recipient.

8. The method of claim 1, wherein the selecting means for rendering includes determination of a means based on a capability of the data processing system.

9. The method of claim 1, wherein determining whether the selected means for secured rendering is appropriate for the ambient environment includes receiving an indication of an appropriateness from the recipient.

10. The method of claim 1, wherein determining whether the selected means for secured rendering is appropriate for the ambient environment includes detecting conversations in the environment.

11. The method of claim 1, wherein determining whether the selected means for secured rendering is appropriate for the ambient environment includes receiving of video images showing people other than the recipient in the environment.

12. The method of claim 1, wherein determining whether the selected means for secured rendering is appropriate for the ambient environment includes receiving infrared signals and analyze the infrared signals to determine if persons other than the recipient are present in the environment.

13. The method of claim 1, wherein determining whether the selected means for secured rendering is appropriate for the ambient environment includes receiving signals from a motion detector and analyzing the signals from the motion detector to determine if persons other than the recipient are present in the environment.

14. The method of claim 1, wherein determining whether the selected means for secured rendering is appropriate for the ambient environment includes determining a location of the data processing system using a global positioning system.

15. The method of claim 1, wherein determining whether the selected means for secured rendering is appropriate for the ambient environment includes determining a location of the data processing system using cellular telephone location systems.

16. The method of claim 1, wherein presenting the plurality of portions of the data to the recipient includes display of the data in a visual format that requires a special lens for detection.

17. The method of claim 1, wherein presenting the plurality of portions of the data to the recipient includes presentation of the data on a personal display in a air of eyeglasses.

18. The method of claim 1, wherein presenting the plurality of potions of the data to the recipient includes presentation of the data using a speaker device in an ear canal of the recipient.

19. The method of claim 1, wherein presenting the plurality of portions of the data to the recipient includes presentation of the data using a vibrating device.

20. The method of claim 1, wherein presenting the plurality of portions of the data to the recipient includes presentation of the data using a Braille touch printer.

21. The method of claim 1, wherein presenting the plurality of portions of the data to the recipient includes presentation of the data involves a special coded format known only to the recipient.

22. The method of claim 21, wherein the special coded format is base on one of a foreign language, icon substitution, and sound pattern generation.

23. A data processing apparatus for presenting data to a recipient rendered in a secured manner, the data processing apparatus comprising:

receiving means for receiving data having a plurality of portions, wherein at least one portion of the data requires secured rendering;

selecting means for selecting, for each of the plurality of portions, a means for rendering, wherein a selected means for rendering for the at least one portion of the data is a means for secured rendering;

determining means for determining whether the selected means for secured rendering is appropriate for an ambient environment of the recipient; and rendering means for presenting the plurality of portions of the data to the recipient using the various selected means for rendering.

24. The data processing apparatus of claim 23, wherein the data processing apparatus is one of a personal computer, a workstation, a laptop computer, an information appliance, a personal digital assistant, a handheld organizer, a pager, a cellular telephone, a digital watch, a television, a cable interface box, a game console and an information presentation device.

25. The data processing apparatus of claim 23, wherein the receiving means for receiving the at least one portion of the data is based on one of a recognition that the at least one portion of the data was encrypted, a tag a name, an attribute value coded in a tag, a default attribute value inferred from a document definition, and a pre-arrangement between a sender and the recipient.

26. The data processing apparatus of claim 25, wherein the pre-arrangement between a sander and the recipient is based on one of a network registry, a network directory, and a security profile.

27. The data processing apparatus of claim 23, wherein the selecting means for secured rendering is based on one of a tag name with attribute value, selection by the recipient, and by a capability of the data processing apparatus.

28. The data processing apparatus of claim 23, wherein the determining means for determining whether the selected means for secured rendering is appropriate for an ambient environment is based on one of an indication of appropriateness by the recipient, detection of conversations in the environment, reception of video images showing people other than the recipient in the environment, analysis of infrared signals to determine if persons other that the recipient are present in the environment, analysis of signals from a motion detector to determine if persons other than the recipient are present in the environment, and determining a location of the data processing system.

29. The data processing apparatus of claim 23, wherein the rendering means for presenting the plurality of portions of the data is one of a personal display in a pair of eyeglasses, a speaker device in an ear canal of the recipient, a vibrating device, a Braille touch printer and a special coded format known only to the recipient.

30. The data processing apparatus of claim 29, wherein the special coded format is based on one of a foreign language, an icon substitution, and a sound pattern generation.

31. A computer program product on a data processing system for presenting data to a recipient rendered in a secured manner, the computer program product comprising:

instructions for receiving data having a plurality of portions, wherein at least one portion of the data requires secured rendering;

instructions for selecting, for each of the plurality of portions, a means for rendering, wherein a selected means for rendering for the at least one portion of the data is a means for secured rendering;

instructions for determining whether the selected means for secured rendering is appropriate for an ambient environment of the recipient; and instructions for presenting the plurality of portions of the data to the recipient using the various selected means for rendering.

32. The computer program product of claim 31, wherein the data processing system is one of a personal computer, a workstation, a laptop computer, an information appliance, a personal digital assistant, a handheld organizer, a pager, a cellular telephone, a digital watch, a television, a cable interface box, a game, console and an information presentation device.

33. The computer program product of claim 31, wherein the instructions for receiving the at least one portion of the data is based on one of a recognition that one or more portions of the data was encrypted, a tag name, an attribute value coded in a tag, a default attribute value inferred from a document definition, and a pre-arrangement between a sender and the recipient.

34. The computer program product of claim 33, wherein the pre-arrangement between a sender and the recipient is based on one of a network registry, a network directory, and a security profile.

35. The computer program product of claim 31, wherein the instructions for selecting a means for secured rendering is based on one of a tag name with attribute value, selection by the recipient, and by a capability of the data processing system.

36. The computer program product of claim 31, wherein the instructions for determining whether the selected means for secured rendering is appropriate for an ambient environment is based on one of an indication of appropriateness by the recipient, detection of conversations in the environment, reception of video images showing people other than the recipient in the environment, analysis of signals from a motion detector to determine if persons other than the recipient are present in the environment, and determining a location of the data processing system.

37. The computer program product of claim 31, wherein the instructions for presenting the plurality of portions of the data is one of a personal display in a pair of eyeglasses, a speaker device in an ear canal of the recipient, a vibrating device, a Braille touch printer and a special coded format known only to the recipient.

38. The computer program product of claim 37, wherein the special coded format is based on one of a foreign language, an icon substitution, and a sound pattern generation.

* * * * *

UNITED STATES PATENT AND TRADEMARK OFFICE
CERTIFICATE OF CORRECTION

PATENT NO. : 6,918,039 B1
DATED : July 12, 2005
INVENTOR(S) : Hind et al.

It is certified that error appears in the above-identified patent and that said Letters Patent is hereby corrected as shown below:

Column 9,
Line 49, after "display in a" delete "air" and insert -- pair --.

Column 10,
Line 27, after "tag" delete "a".
Line 32, after "between a" delete "sander" and insert -- sender --.
Line 46, after "other" delete "that" and insert -- than --.

Column 11,
Line 16, after "game" delete ",".

Signed and Sealed this

Twenty-first Day of February, 2006

JON W. DUDAS
*Director of the United States Patent and Trademark Office*